United States Patent [19]

Ohno et al.

[11] 4,429,899
[45] Feb. 7, 1984

[54] HOLLOW STABILIZER FOR VEHICLE

[75] Inventors: Akira Ohno; Toshiaki Sato; Kanji Inoue, all of Yokohama, Japan

[73] Assignee: NHK Spring Co., Ltd., Yokohama, Japan

[21] Appl. No.: 443,453

[22] Filed: Nov. 22, 1982

Related U.S. Application Data

[63] Continuation of Ser. No. 183,386, Sep. 2, 1980, abandoned.

[30] Foreign Application Priority Data

Sep. 7, 1979 [JP] Japan .................................. 54-123805

[51] Int. Cl.³ .............................................. B60G 19/00
[52] U.S. Cl. ...................................... 280/689; 72/367
[58] Field of Search ............... 280/689, 691, 713, 721, 280/725, 47.27; 72/367, 369, 370, 388; 29/155 R, 515, 517; 52/727

[56] References Cited

U.S. PATENT DOCUMENTS

| 1,823,158 | 9/1931 | Mogford | 29/517 |
| 4,095,450 | 6/1978 | Opland et al. | 72/367 |
| 4,138,141 | 2/1979 | Andersen | 280/689 |

FOREIGN PATENT DOCUMENTS 951827  3/1964  United Kingdom .

OTHER PUBLICATIONS

The Car and the Wheels, Jun. 1980, p. 102.

Primary Examiner—Robert R. Song
Attorney, Agent, or Firm—Frishauf, Holtz, Goodman & Woodward

[57] ABSTRACT

The stabilizer according to the invention is made from a single pipe, and it comprises a torsion section coupled to a vehicle frame, curved sections integrally extending from the opposite ends of the torsion section and arm sections each integrally extending from each of the curved sections and coupled to a wheel suspension. Each of the curved sections has a flat section extending in the plane of action of the bending load applied to it.

1 Claim, 8 Drawing Figures

HOLLOW STABILIZER FOR VEHICLE

This is a continuation of application Ser. No. 183,386 filed Sept. 2, 1980, now abandoned.

BACKGROUND OF THE INVENTION

This invention relates to a hollow stabilizer for a vehicle, which is made of a single pipe and has a torsion section coupled to a vehicle frame, curved sections each integrally extending from each end of the torsion section and arm sections each integrally extending from each curved section and having a free end coupled to a wheel suspension.

Stabilizers of this sort have hitherto been used for the purpose of improving the feel of riding and stability of vehicles, such as automobiles, by improving the tilting of the vehicle at the time of turning, caused by centrifugal forces and imbalance of the road holding force on the opposite side wheels. Usually, the stabilizer has a construction constituted by a single metal pipe, which has a central torsion section terminating at the opposite ends in curved sections defining an obtuse angle and terminating in turn in respective arm sections. The torsion section is coupled to the frame of the automobile or the like via mounting members such that it extends in the lateral direction, while the arm sections are coupled to the opposite sides of a vehicle suspension via coupling sections provided at their free ends. Mounted in this way, the stabilizer acts to suppress the outward tilting of the vehicle and also the floating of the inner wheels at the time of the turning of the vehicle.

With this stabilizer the stress distribution is such that the bending stress is mainly produced in the arm sections and curved sections and maximum in a portion of the curved section adjacent to each arm section and that the shearing stress is not produced in the arm sections at all but is uniformly produced in the torsion section, with the maximum stress mostly produced in the curved sections. Thus, the shape of the stabilizer has to correspond to the aforementioned stress distribution and is determined by taking the weight of the vehicle body, the centroid thereof and the construction of the vehicle suspension into consideration.

In order to reduce the weight of the stabilizer it has been in practice to manufacture the stabilizer from metal pipe. In this case, however, if the pipe thickness is excessively reduced for increasing the weight reduction factor the bending rigidity is reduced. Accordingly, it has been proposed to set the outer diameter and thickness of the pipe such that the torsion spring constant thereof is substantially the same as that of a solid material. By so doing, however, the second moment of area is reduced, and the rigidity particularly of the arm section, in which the bending stress is concentrated, is liable to be insufficient. In such a case, in which the bending rigidity of the stabilizer is comparatively low in particular sections, it is necessary to use a pipe of a large thickness to improve the rigidity of the stabilizer as a whole, and this is not considered to be the best measure for the weight reduction.

SUMMARY OF THE INVENTION

The invention is predicated on research and investigation onto the distribution of the load applied to the hollow stabilizer, and its primary object is to provide a hollow stabilizer for a vehicle, which permits the reduction of its weight without reducing the rigidity of it as a whole by improving the second moment of area in its arm sections.

To achieve the above objective, in the stabilizer according to the invention, the arm sections are constructed such that each of them has a flat section having an I-shaped sectional profile and extending in a plane, in which the bending load is applied to each arm section.

In a preferred embodiment of the invention, the aforementioned flat section is formed such that it has head portions extending along its opposite edges and raised from the rest of it.

With the stabilizer according to the invention, in which the arm section has a substantially I-shaped sectional profile with respect to the direction of action of the bending force, with head portions formed along the opposite edges of the arm section, it is possible to achieve the weight reduction of the arm sections and hence the whole stabilizer.

DETAILED DESCRIPTION OF THE PREFERRED EMBODIMENT

Figure 1:
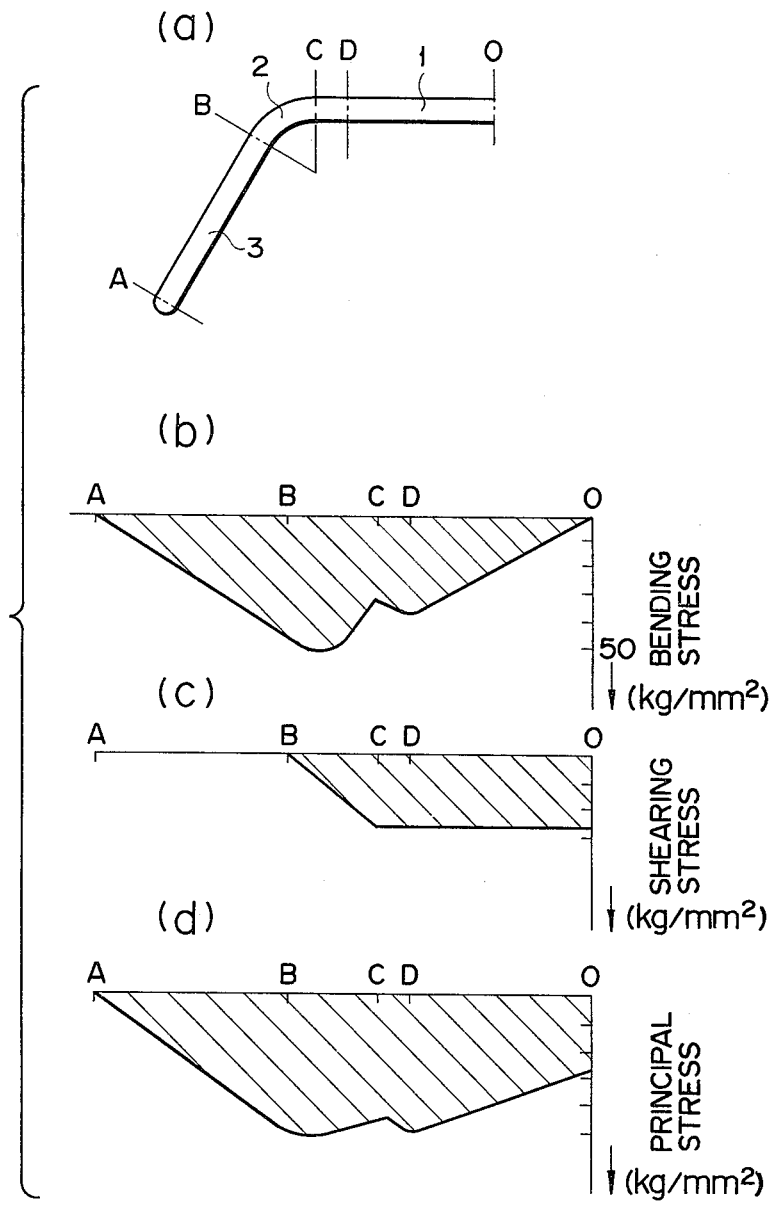
FIG. 1(a) is a schematic plan view showing the left hand half of a hollow stabilizer.
FIG. 1(b) is a graph showing the bending stress distribution characteristic of the stabilizer of FIG. 1(a)
FIG. 1(c) is a graph showing the shearing stress distribution characteristic of the stabilizer of FIG. 1(a)
FIG. 1(d) is a graph showing the principal stress distribution of the stabilizer of FIG. 1(a)
Figure 2:
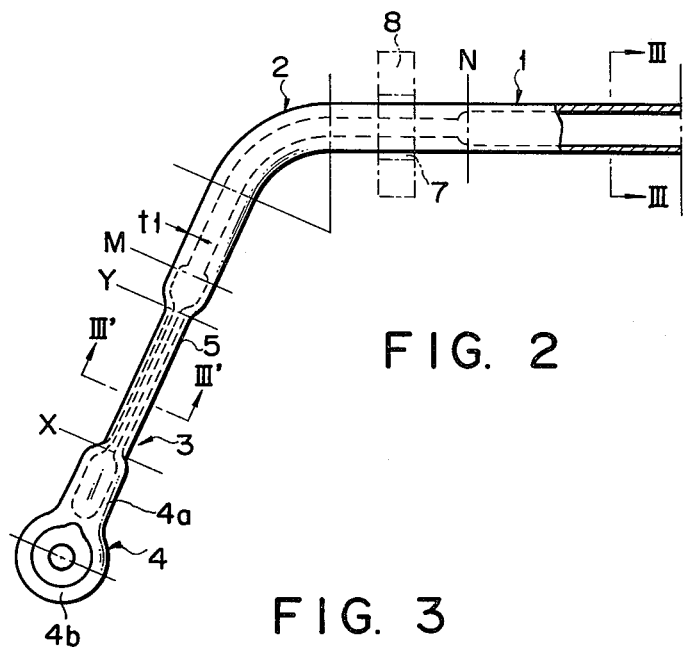
FIG. 2 is a detailed sectional view of the stabilizer of FIG. 1(a)

FIGS. 1(a) and 2 show the left hand half of the hollow stabilizer according to the invention. This stabilizer is line symmetrical in shape, so that its portion on the right hand side of its center line 0 is not shown. FIG. 1(a) is given for the purpose of illustrating various stress distribution states of the stabilizer together with FIGS. 1(b), 1(c) and 1(d), so that in the Figure the stabilizer is shown in a simplified form.

the stabilizer shown in FIG. 1(a) has a torsion section 1 terminating at each end in a curved section 2 which in turn terminates in an arm section 3. The free end A of the arm section 3 is coupled to a vehicle suspension. In FIGS. 1(b), 1(c) and 1(d) the ordinate is respectively taken for the bending stress, shearing stress and principal stress, and points A, B, C, D and O on the abscissa correspond to respective positions of the stabilizer. As is seen from FIG. 1(b), the bending stress is high in the arm sections 3 and curved section 2; particularly, it is high in a portion of the curved section 2 near the arm section 3. Also as is seen from FIG. 1(c), the shearing stress is not produced in the arm section at all but is uniformly produced in the torsion section. Further, as is seen from FIG. 1(d) which shows the principal stress distribution as the resultant of the stress distributions of FIGS. 1(b) and 1(c), the maximum principal stress is in a portion of the curved section 2.

Figure 3:
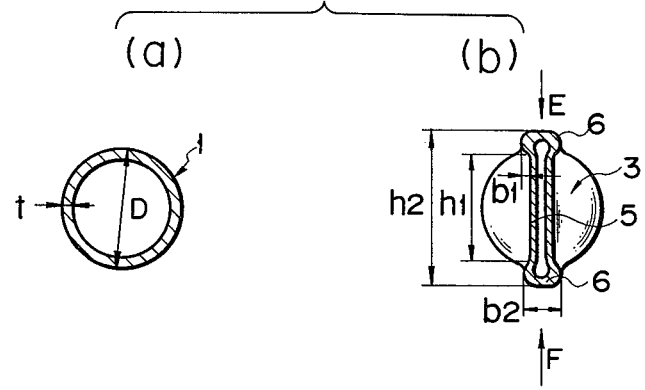
FIG. 3(a) is a sectional view taken along line III—III in FIG. 2.
FIG. 3(b) is a sectional view taken along line III'—III' in FIG. 2.

FIG. 2 shows the left hand half of the stabilizer. Designated at 1 is a torsion section. The torsion section 1 terminates at each end in a curved section 2 defining an obtuse angle and terminating in turn in an arm section 3. The arm section 3 is provided at its free end with a coupling section 4 which is coupled to a vehicle suspension (not shown). In one preferred embodiment, the torsion section 1, curved section 2, arm section 3 and coupling section 4 are formed from a single pipe having a circular sectional profile as shown in FIG. 3(a). The torsion section 1 and curved section 2 have a uniform outer diameter, and the coupling section 4 has a circular sectional portion 4a and a flat shape portion 4b. A predetermined portion of the arm section 2 between positions X and Y has a flat shape extending in the direction of action of the bending load applied to the arm section 2, i.e., the directions of arrows E and F in FIG. 3(b). This shape is formed by pressing the pipe in the directions perpendicular to the direction of action of the bending load. Also, this flat section 5 has an I-shaped sectional profile with its opposite edge portions 6 raised in the aforementioned opposite directions with respect to the rest of it. A section M-N including the curved section 2, in which the maximum principal stress is produced, has a thickness $t_1$ greater than the thickness t of the rest of the stabilizer (i.e., $t_1 \leqq t$); that is, its inner diameter is reduced that much compared to the rest of the stabilizer.

The torsion section 1 extends in the lateral direction of the vehicle frame and is coupled at its opposite ends to the frame via rubber bushes 7 and mounting members 8 (shown by imaginary line).

The second moment of area of the arm section 3 and that of the pipe itself will now be compared. In the embodiment shown in FIGS. 3(a) and 3(b), a pipe having an outer diameter D of D=20 mm and a thickness t of t=2 mm is used, and the dimensions of the cross sectional profile of the arm section 3 are set such that the height $h_2$ is $h_2$=25 mm, the width $b_1$ of the raised portion of the head portion is $b_1$=0.5 mm, the width $b_2$ of the head portion 6 is $b_2$=6 mm and the distance $h_1$ between the opposite edge head portions is $h_1$=17 mm. Since the second moment of area of a pipe is given as $$I_1 = \pi/64(d_2^4 - d_1^4) \quad (1)$$

by substituting the aforementioned numerical values into equation (1) we obtain $$I_1 = 4,600 \text{ kg/mm}^2$$

Also, since the second moment of area of the arm section 3 is approximately given as $$I_2 = (1/12)(b_2 h_2^3 - b_1 h_1^3) \quad (2)$$

by substituting the aforementioned numerical values into equation (2) we obtain $$I_2 = 6,270 \text{ kg/mm}^2$$

Thus, it will be seen that by forming the arm section 3 to have substantially an I-shaped profile its second moment of area $I_2$ can be increased by about 35%. In this way, the rigidity of the stabilizer can be increased without need of increasing the thickness of, particularly, the arm section 3, in which the bending stress is produced, thus permitting the improvement of the weight reduction factor of the stabilizer as a whole. In addition, with the stabilizer according to the invention at the time of forming the flat arm section 3, the end of coupling section 4 extending from the end of the arm section 3 can be flattened to form flat shaped portion 4b at the same time to improve the efficiency of manufacture. The flat shaped portion 4b of the coupling section 4 extends in a plane substantially perpendicular to the plane of the I cross-section of the arm secton 3.

Figure 4:
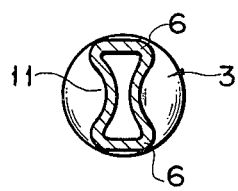
FIG. 4 is a sectional view showing a modification of the embodiment of FIG. 3(b).

The above example of the invention is by no means limitative. For example, the arm section is essentially required to have opposite edge head portions raised from the other flat portion so as to provide for an improved second moment of area, that is, it may have various other suitable sectional profiles such as an arm section 11 shown in FIG. 4.

Further, the various sectional profile dimensions of the arm section are by no means limited to the aforementioned numerical values, but they are suitably determined by taking the weight of the vehicle, the center of the weight thereof, the construction of the vehicle suspension, etc. into consideration.

As has been described in the foregoing, according to the invention, the arm section in which the bending stress is produced, has an I-shaped sectional profile extending in the direction of action of the bending force, so that it is possible to obtain an increased second moment of area in the arm section and hence obtain an increased rigidity. Thus, the rigidity of the stabilizer can be increased without need of increasing the thickness of the arm section, in which the bending load is applied, thus permitting the improvement of the weight reduction factor of the stabilizer as a whole and hence the reduction of the unsprung weight of the vehicle provided with this stabilizer. In addition, the construction according to the invention presents no problems in the fatigue life, so that it is very beneficial in practice.

What we claim is:

1. A hollow stabilizer for a vehicle made from a single hollow pipe, said single hollow pipe comprising:
    a hollow torsion section (1) coupled to the vehicle, said torsion section having a substantially circular cross-section;
    hollow curved sections (2) integrally extending from the opposite ends of said hollow torsion section (1);
    arm sections (3) integrally formed with, and extending from said curved sections (2) respectively, said arm sections (3) each having a cross-section substantially in the form of the letter I and which extends in a plane of action of the bending load applied to each said arm section; and
    coupling sections (4) integrally formed with, and extending from, said respective arm sections (3), said coupling sections each having a substantially circular cross sectional portion (4a) connected to the end of the respective arm section (3) and a substantially flat shaped portion (4b) extending from said substantially circular coupling section portion (4a) and adapted to be coupled to a wheel suspension, each substantially flat shaped portion (4b) of said coupling sections extending in a plane substantially perpendicular to the plane of said I-shaped cross sectional portion of said arm section (3).

* * * * *